United States Patent
Tan et al.

(10) Patent No.: US 9,429,209 B2
(45) Date of Patent: *Aug. 30, 2016

(54) MAGNETICALLY SUSPENDED AND PLANE-DROVE VIBRATION ISOLATOR

(71) Applicant: HARBIN INSTITUTE OF TECHNOLOGY, Harbin, Heilongjiang (CN)

(72) Inventors: Jiubin Tan, Heilongjiang (CN); Junning Cui, Heilongjiang (CN); Lei Wang, Heilongjiang (CN)

(73) Assignee: Harbin Institute of Technology, Harbin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/421,409

(22) PCT Filed: Feb. 19, 2014

(86) PCT No.: PCT/CN2014/072277
§ 371 (c)(1),
(2) Date: Feb. 12, 2015

(87) PCT Pub. No.: WO2014/094687
PCT Pub. Date: Jun. 26, 2014

(65) Prior Publication Data
US 2015/0219180 A1    Aug. 6, 2015

(30) Foreign Application Priority Data
Dec. 19, 2012    (CN) .......................... 2012 1 0574587

(51) Int. Cl.
*F16M 13/00*    (2006.01)
*F16F 15/03*    (2006.01)
(Continued)

(52) U.S. Cl.
CPC .............. *F16F 15/03* (2013.01); *F16F 15/002* (2013.01); *G01B 7/004* (2013.01); *G01D 5/20* (2013.01); *H02K 41/0354* (2013.01)

(58) Field of Classification Search
CPC ... F16F 15/03; F16F 15/002; F16C 32/0614; G01B 7/003; G01D 5/20; G01L 19/00; H02K 41/0356; G03F 7/70833
USPC .......................... 248/660, 638, 644, 678, 550
See application file for complete search history.

(56) References Cited

U.S. PATENT DOCUMENTS

| | | | |
|---|---|---|---|
| 5,548,170 A * | 8/1996 | Shultz ................. | F16C 32/0651 310/90.5 |
| 5,573,088 A * | 11/1996 | Daniels .............. | B60G 17/0157 188/267 |
| 5,844,664 A | 12/1998 | Van Kimmenade et al. | |
| 6,144,442 A | 11/2000 | 'T Mannetje et al. | |

(Continued)

FOREIGN PATENT DOCUMENTS

| EP | 1 486 825 A1 | 12/2004 |
|---|---|---|
| EP | 1 803 965 A2 | 7/2007 |

(Continued)

OTHER PUBLICATIONS

Espacenet English abstract of EP 1 803 965 A2.

(Continued)

*Primary Examiner* — Gwendolyn Baxter
(74) *Attorney, Agent, or Firm* — Ladas & Parry LLP

(57) ABSTRACT

A magnetically suspended and plane-drove vibration isolator with zero stiffness comprises an upper mounting plate, a lower mounting plate and a main body. A sleeve of the main body is lubricated and supported against the lower mounting plate by a magnetically suspended planar motor. A piston cylinder fitted in the sleeve is lubricated against the sleeve by a cylindrical air bearing surface. The angle degree of freedom between the upper mounting plate and the lower mounting plate is decoupled by a spherical air bearing. A position close-loop control system is formed to precisely control the relative position between the upper mounting plate and the lower mounting plate.

5 Claims, 2 Drawing Sheets

(51) Int. Cl.
*H02K 41/035* (2006.01)
*G01B 7/004* (2006.01)
*G01D 5/20* (2006.01)
*F16F 15/00* (2006.01)

(56) References Cited

U.S. PATENT DOCUMENTS

| | | | |
|---|---|---|---|
| 7,084,956 B2 | 8/2006 | Dams et al. | |
| 2002/0003997 A1* | 1/2002 | Orinski | B23P 19/10 |
| | | | 414/590 |
| 2004/0065517 A1 | 4/2004 | Watson et al. | |
| 2008/0193061 A1 | 8/2008 | Heiland | |
| 2010/0284638 A1* | 11/2010 | Hirata | F16C 32/067 |
| | | | 384/100 |
| 2014/0374565 A1* | 12/2014 | Tan | F16F 15/023 |
| | | | 248/542 |
| 2015/0219179 A1* | 8/2015 | Cui | F16F 15/03 |
| | | | 248/550 |
| 2015/0260255 A1* | 9/2015 | Tan | F16F 15/0232 |
| | | | 248/550 |

FOREIGN PATENT DOCUMENTS

| | | |
|---|---|---|
| EP | 1 803 970 A2 | 7/2007 |
| WO | 99/22272 A1 | 5/1999 |

OTHER PUBLICATIONS

Espacenet English abstract of EP 1 803 970 A2.

* cited by examiner

MAGNETICALLY SUSPENDED AND PLANE-DROVE VIBRATION ISOLATOR

CROSS-REFERENCE TO RELATED APPLICATION

This U.S. application claims priority under 35 U.S.C 371 to, and is a U.S. National Phase application of, the International Patent Application No. PCT/CN2014/072277, filed 19 Feb. 2014, which claims the benefit of prior Chinese Application No. 201210574587.8 filed 19 Dec. 2012. The entire contents of the above-mentioned patent applications are incorporated by reference as part of the disclosure of this U.S. application.

FIELD OF INVENTION

The present invention relates to a magnetically suspended and plane-drove vibration isolator with zero stiffness whose angle degree of freedom is decoupled with a spherical air bearing, which can be used for low frequency and high performance vibration isolation.

DESCRIPTION OF PRIOR ART

With quick development of precision measurement and manufacturing, environmental vibration has become a main factor that limits the precision and performance of precision measuring instruments and manufacturing equipments. For example, step-scan lithography machines are most precise among all kinds of manufacturing equipments, their line width of lithography is up to 22 nm, and their wafer positioning precision and overlay precision is up to several nanometers. Meanwhile, movement speed of their wafer stages is up to 1 m/s, and acceleration is up to dozens of times of gravitational acceleration. For such ultra-precision equipments, precision vibration isolation is a key technology. On one hand, a very quiet environment should be provided for measuring systems and objective lens, while wafer stages should be moved with high speed and acceleration. 3D nature frequencies of the vibration isolation system should be smaller than 1 Hz. On the other hand, relative position between key parts in a lithography machine, such as the distance between objective lens and wafers, should be precisely controlled, control precision of the relative position between upper mounting plates and lower mounting plates of vibration isolators should reach 10 μm.

The natural frequency of a passive vibration isolator is proportional to its stiffness, and inversely proportional to its mass. Therefore it is a very efficient way to lower the natural frequency of a vibration isolator and improve its performance through reducing its stiffness. However, for a traditional vibration isolator based on an air spring, it's very difficult to further reduce its stiffness, especially horizontal stiffness. To solve this problem, researchers introduce a "pendulum" structure in vibration isolators based on air springs to reduce the horizontal stiffness (1. Nikon Corporation. Vibration Isolator with Low Lateral Stiffness. U.S. Patent No.: US20040065517A1; 2. U.S. Philips Corporation. Positioning Device with a Force Actuator System for Compensating Center-of-gravity Displacements, and Lithographic Device Provided with Such A Positioning Device. U.S. Patent No.: US005844664A). With this method, lateral stiffness of a vibration isolator based on an air spring can be reduced and its performance can be improved to a certain extent. However, there are still following shortcomings: 1) the extent of reduction of horizontal and vertical stiffness is limited by material property and structural stiffness; 2) horizontal and vertical positioning precision of a vibration isolator based on an air spring is too low to meet the requirement of lithography; 3) a large length of "pendulum" is needed to achieve low horizontal stiffness, easily results large height of vibration isolators, chord-membrane-resonance and poor stability.

It's difficult to meet requirements of low stiffness and high positioning precision in a lithography machine with existing vibration isolators based on air springs. German company IDE presents a new vibration isolator design (1. Integrated Dynamics Engineering GmbH. Isolatorgeometrie Eines Schwingungsisolationssystem. European Patent No.: EP1803965A2; 2. Integrated Dynamics Engineering GmbH. Schwingungsisolationssystem Mit Pneumatischem Tiefpassfilter. European Patent No.: EP1803970A2; 3. Integrated Dynamics Engineering GmbH. Air Bearing with Consideration of High-Frequency Resonances. US Patent No.: US20080193061A1). Air bearing surfaces are introduced to decouple and isolate vertical and horizontal vibration, and very low stiffness and natural frequency can be achieved. However, there are still following shortcomings: 1) high positioning precision can't be achieved with presented design; 2) in patent EP1803965A2, there is no rotary degree of freedom around horizontal axes between the upper and lower mounting plates, so stiffness and natural frequency in that direction are both high; in patents EP1803970A2 and US20080193061A1, a rubber block is used to provide the rotary degree of freedom around horizontal axes, however, the angle degree of freedom can't be effectively decoupled due to large angular stiffness of the rubber block.

Netherlandish company ASML has proposed a similar design (1. U.S. Philips Corp, ASM Lithography B.V. Pneumatic Support Device with A Controlled Gas Supply, and Lithographic Device Provided with Such A Support Device. US Patent No.: US006144442A; 2. Koninklijke Philips Electronics N.V., ASM Lithography B.V. Lithographic Pneumatic Support Device with Controlled Gas Supply. International patent publication No.: WO99/22272; 3. ASML Netherlands B.V. Support Device, Lithographic Apparatus, and Device Manufacturing Method Employing A Supporting Device, and A Position Control System Arranged for Use in A Supporting Device. US Patent No.: US007084956B2; 4. ASML Netherlands B.V. Support Device, Lithographic Apparatus, and Device Manufacturing Method Employing A Supporting Device and A Position Control System Arranged for Use in A Supporting Device. European Patent No.: EP1486825A1). The air pressure is close-loop controlled to increase stability and performance of vibration isolators in patents US006144442A and WO99/22272. A vibration sensor is mounted on the upper mounting plate and a reference system is introduced as well to improve performance of vibration isolation in patents US007084956B2 and EP1486825A1. However, problems of precision positioning and decoupling of angle degree of freedom between the upper and lower mounting plates are still not solved.

SUMMARY OF INVENTION

In order to solve the problem of precision positioning and decoupling of angle degree of freedom, the prevent invention provides a vibration isolator with 3D zero stiffness whose angle degree of freedom is decoupled with a spherical air bearing, and it can be used for high performance vibration isolation in precision measuring instruments and manufacturing equipments, such as step-scan lithography machines.

The present invention provides a magnetically suspended and plane-drove vibration isolator with zero stiffness whose angle degree of freedom is decoupled with a spherical air bearing, which comprises a upper mounting plate, a lower mounting plate, a clean air compressor, an air pipe and a main body, the main body is fitted between the upper mounting plate and the lower mounting plate, and the clean air compressor is connected to the main body via the air pipe; in the main body, the lower surface of a downside-down sleeve and the lower mounting plate are vertically supported against each other with a magnetically suspended planar motor, a upside-down piston cylinder is fitted inside the sleeve and they are lubricated against each other with a cylindrical air bearing surface, a spherical air bearing is fitted between the piston cylinder and the upper mounting plate, a voice coil motor in Z direction, a displacement sensor in Z direction and a limit switch in Z direction are fitted between the piston cylinder and the sleeve, a displacement sensor in X direction and a limit switch in X direction as well as a displacement sensor in Y direction and a limit switch in Y direction are fitted between the sleeve and the lower mounting plate, the direction of driving force of the voice coil motor in Z direction is vertical, while the first and second directions of driving force of the magnetically suspended planar motor are horizontal and perpendicular to each other, the sensitive direction of the displacement sensor in X direction, the displacement sensor in Y direction and the displacement sensor in Z direction as well as the limit switch in X direction, the limit switch in Y direction and the limit switch in Z direction are the same as the first directions of driving force of the magnetically suspended planar motor, the second directions of driving force of the magnetically suspended planar motor and the voice coil motor in Z direction respectively; the displacement sensor in X direction, the displacement sensor in Y direction and the displacement sensor in Z direction as well as the limit switch in X direction, the limit switch in Y direction and the limit switch in Z direction are connected to signal input terminals of a controller, signal output terminals of the controller are connected to signal input terminals of a driver, and signal output terminals of the driver are connected to the magnetically suspended planar motor and the voice coil motor in Z direction respectively.

Preferably an air pressure sensor is fitted inside the piston cylinder, there is an air inlet and an electromagnetic valve in the piston cylinder, the air pressure sensor is connected to a signal input terminal of the controller, a signal output terminal of the driver is connected to the electromagnetic valve.

Preferably the magnetically suspended planar motor is configured as follows: the mover of planar motor is fitted on the bottom of the sleeve, the stator of planar motor is oppositely fitted on the top of the lower mounting plate.

The voice coil motor in Z direction is a cylindrical voice coil motor or a flat voice coil motor.

The displacement sensor in X direction, displacement sensor in Y direction and displacement sensor in Z direction are grating rulers, magnetic grid rulers, capacitive grid rulers or linear potentiometers.

The limit switch in X direction, limit switch in Y direction and limit switch in Z direction are mechanical limit switches, Hall limit switches or photoelectric limit switches.

Preferably the air pressure inside said piston cylinder is 0.1 MP~0.8 MPa.

Preferably the thickness of the gap of magnetic suspending between the mover of the magnetically suspended planar motor and the stator of the magnetically suspended planar motor is 0.01 mm~1 mm.

The present invention has following advantages:

(1) No fiction, wear and additional stiffness introduced into vibration isolators during decoupling of angle degree of freedom. In the present invention a spherical air bearing is used to decouple the angle degree of freedom between the upper and lower mounting plates, and the problem of friction, wear and introduction of additional stiffness of existing designs and patents during decoupling with elastic body can be successfully solved.

(2) Approximate 3D zero stiffness so that outstanding low frequency vibration isolation performance can be achieved. In the present invention, a magnetically suspended planar motor and a cylindrical air bearing surface are employed to decouple and isolation vibration in horizontal and vertical directions, the difficulty of achieving very low stiffness and contradiction between stiffness and stability of existing designs and patents can be solved.

(3) High positioning precision for relative position control between the upper and lower mounting plates. The present invention employs motors, displacement sensors, limit switches, a controller and a driver to form position close-loop control systems in vertical and horizontal directions, so that the relative position between the upper and lower mounting plates can be precisely controlled with precision up to 10 μm. The problem of low positioning precision and contradiction between positioning precision and stiffness of existing design and patents can be solved.

(4) Ideal gravity balance for excellent vertical vibration isolation with zero stiffness. The present invention employs an air pressure sensor, an electromagnetic valve, a controller and a driver to form an air pressure close-loop control system, so that the air pressure inside the sleeve is precisely controlled, and the gravity of vertical load of the vibration isolator can be balanced very precisely.

BRIEF DESCRIPTION OF ACCOMPANYING DRAWINGS

DESCRIPTION OF PREFERRED EMBODIMENTS

Preferred embodiments of the present invention will be described in detail with reference to accompanying drawings.

Figure 1:
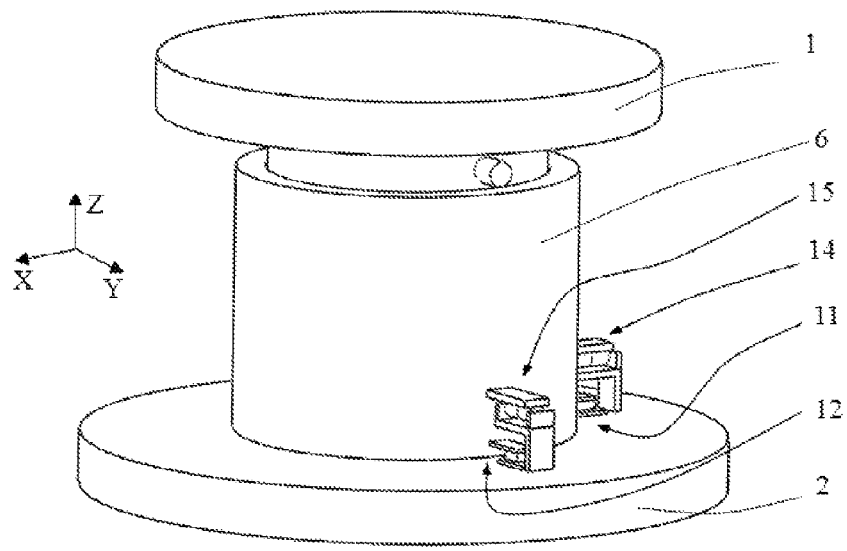
FIG. 1 is a structural diagram of the magnetically suspended and plane-drove vibration isolator with zero stiffness whose angle degree of freedom is decoupled with a spherical air bearing.
Figure 2:
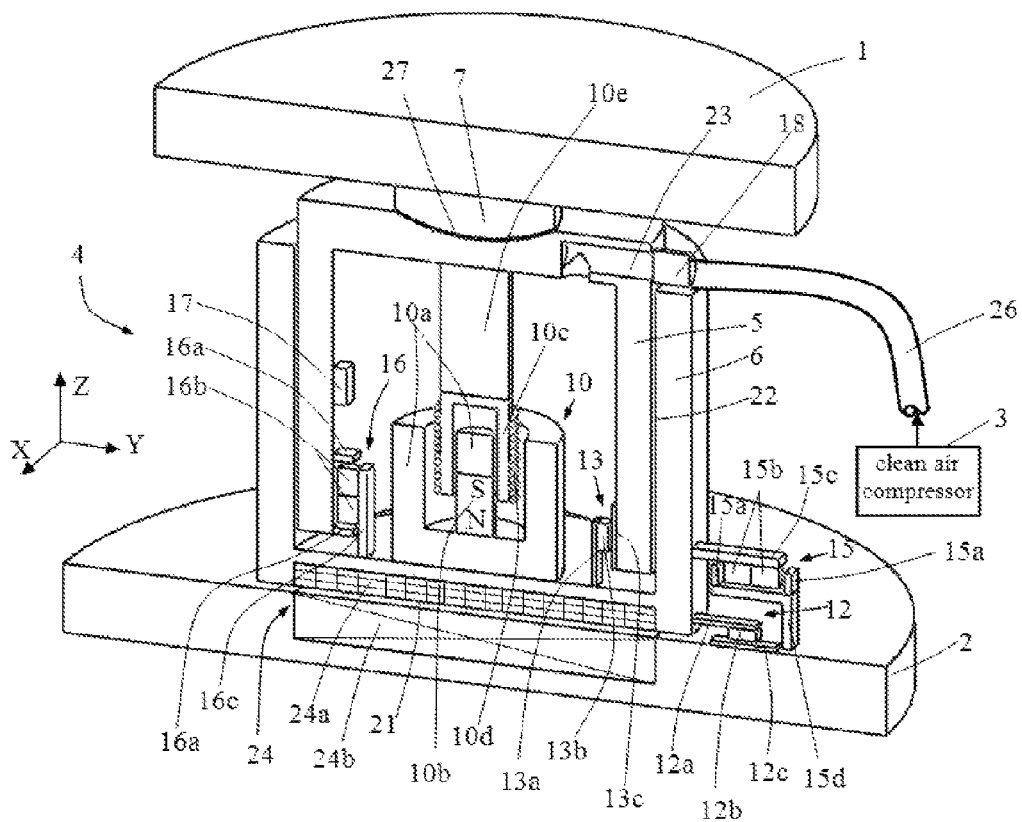
FIG. 2 is a 3D cross-sectional view of the magnetically suspended and plane-drove vibration isolator with zero stiffness whose angle degree of freedom is decoupled with a spherical air bearing.
Figure 3:
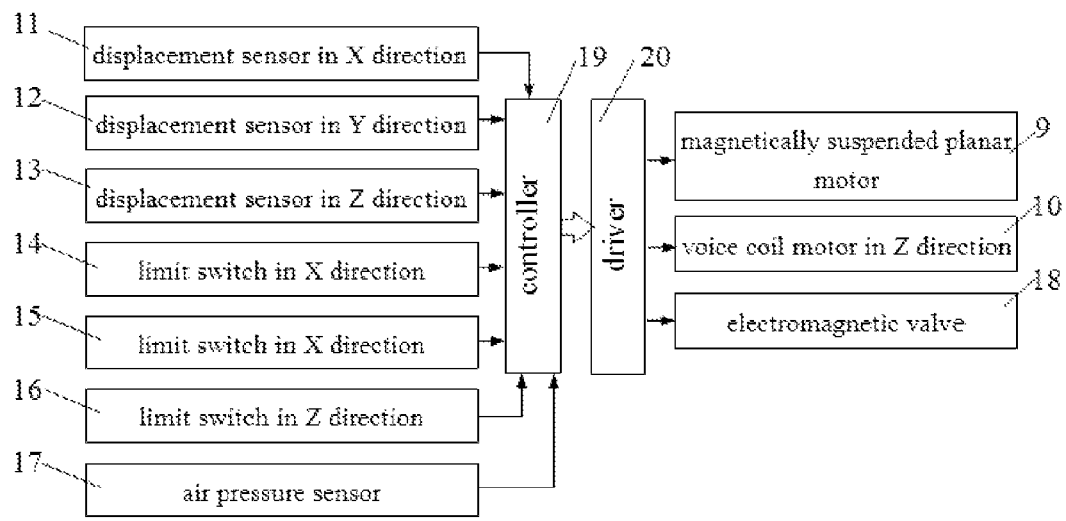
FIG. 3 is a control block diagram of the magnetically suspended and plane-drove vibration isolator with zero stiffness whose angle degree of freedom is decoupled with a spherical air bearing.

As shown in FIG. 1, FIG. 2 and FIG. 3, a magnetically suspended and plane-drove vibration isolator with zero stiffness whose angle degree of freedom is decoupled with a spherical air bearing comprises a upper mounting plate 1, a lower mounting plate 2, a clean air compressor 3, an air pipe 26 and a main body 4, the main body 4 is fitted between the upper mounting plate 1 and the lower mounting plate 2, and the clean air compressor 3 is connected to the main body 4 with the air pipe 26; in the main body 4, the lower surface of a downside-down sleeve 6 and the lower mounting plate 2 are supported against each other with a magnetically suspended planar motor 24, a upside-down piston cylinder 5 is fitted inside the sleeve 6 and they are lubricated against each other with a cylindrical air bearing surface 22, a spherical air bearing 7 is fitted between the piston cylinder 5 and the upper mounting plate 1, a voice coil motor in Z direction 10, a displacement sensor in Z direction 13 and a limit switch in Z direction 16 are fitted between the piston cylinder 5 and the sleeve 6, a displacement sensor in X direction 11 and a limit switch in X direction 14 as well as a displacement sensor in Y direction 12 and a limit switch in Y direction 15 are fitted between the sleeve 6 and the lower mounting plate 2, the direction of driving force of the voice coil motor in Z direction 10 is vertical, while the first and second directions of driving force of the magnetically suspended planar motor 24 are horizontal and perpendicular to each other, the sensitive direction of the displacement sensor in X direction 11, the displacement sensor in Y direction 12 and the displacement sensor in Z direction 13 as well as the limit switch in X direction 14, the limit switch in Y direction 15 and the limit switch in Z direction 16 are the same as the first directions of driving force of the magnetically suspended planar motor 24, the second directions of driving force of the magnetically suspended planar motor 24 and the voice coil motor in Z direction 10 respectively; the displacement sensor in X direction 11, the displacement sensor in Y direction 12 and the displacement sensor in Z direction 13 as well as the limit switch in X direction 14, the limit switch in Y direction 15 and the limit switch in Z direction 16 are connected to signal input terminals of a controller 19, signal output terminals of the controller 19 are connected to signal input terminals of a driver 20, and signal output terminals of the driver 20 are connected to the magnetically suspended planar motor 24 and the voice coil motor in Z direction 10 respectively.

Preferably an air pressure sensor 17 is fitted inside the piston cylinder 5, there is an air inlet 23 and an electromagnetic valve 18 in the piston cylinder 5, the air pressure sensor 17 is connected to a signal input terminal of the controller 19, a signal output terminal of the controller 19 is connected to a signal input terminal of the driver 20, a signal output terminal of the driver 20 is connected to the electromagnetic valve 18.

Preferably the magnetically suspended planar motor 24 is configured as follows: the mover of planar motor 24a is fitted on the bottom of the sleeve 6, the stator of planar motor 24b is oppositely fitted on the top of the lower mounting plate 2.

The voice coil motor in Z direction 10 is a cylindrical voice coil motor or a flat voice coil motor.

The displacement sensor in X direction 11, displacement sensor in Y direction 12 and displacement sensor in Z direction 13 are grating rulers, magnetic grid rulers, capacitive grid rulers or linear potentiometers.

The limit switch in X direction 14, limit switch in Y direction 15 and limit switch in Z direction 16 are mechanical limit switches, Hall limit switches or photoelectric limit switches.

Preferably the air pressure inside said piston cylinder 5 is 0.1 MPa~0.8 MPa.

Preferably the thickness of the gap of magnetic suspending 21 between the mover of the magnetically suspended planar motor 24a and the stator of the magnetically suspended planar motor 24b is 0.01 mm-1 mm.

One embodiment of the prevent invention is provided with reference to FIG. 1, FIG. 2 and FIG. 3. In this embodiment, the lower mounting plate 2 is fitted onto the base of measurement instruments or manufacturing equipments, and the upper mounting plate 1 is fitted onto the load to be vibration isolated. The voice coil motor in Z direction 10 is a cylindrical voice coil motor. It comprises an iron yoke of motor Z 10a, a magnetic block of motor Z 10b, a coil skeleton of motor Z 10c, a coil of motor Z 10d and a mounting piece of motor Z 10e. The iron yoke of motor Z 10a, the magnetic block of motor Z 10b, and the coil skeleton of motor Z 10c are cylindrical, the coil of motor Z 10d is wound around the coil skeleton of motor Z 10c, the mounting piece of motor Z 10e provide a mounting structure for the coil skeleton of motor Z 10c. According to electromagnetic theory, magnitude and direction of driving force which the motor outputs can be precisely controlled by adjusting magnitude and direction of current in the coil.

The spherical air bearing 7 in this embodiment is fitted in such a way: its lower surface is mounted onto the piston cylinder 5, and is lubricated and supported against the piston cylinder 5 with the spherical air bearing surface 27, the upper surface of spherical air bearing 7 is rigidly fitted onto the upper mounting plate 1.

In this embodiment, the displacement sensor in X direction 11, the displacement sensor in Y direction 12 and the displacement sensor in Z direction 13 are grating rulers. Take the displacement sensor in Z direction 13 for example, it comprises a mounting piece of grating Z 13a, a reading head of grating Z 13b and a glass ruler of grating Z 13c. The mounting piece of grating Z 13a provides a mounting structure for the reading head of grating Z 13b. The reading head of grating Z 13b can detect the relative displacement between itself and the glass ruler of grating Z 13c, and then deliver the displacement signal to the controller 19.

In this embodiment, the limit switch in X direction 14, the limit switch in Y direction 15 and the limit switch in Z direction 16 are Hall limit switches. Take the limit switch in Z direction 16 for example, it comprises two limit blocks of switch Z 16a, two Hall switches of switch Z 16b and a mounting piece of switch Z 16c. Two Hall switches of switch Z 16b are fitted back to back against each other. The mounting piece of switch Z 16c provides a mounting structure for two Hall switches of switch Z 16b. When two Hall switches of switch Z 16b are moved close to limit blocks of switch Z 16a, a limit signal will be generated and delivered to the controller 19.

In this embodiment, the voice coil motor in Z direction 10, the displacement sensor in Z direction 13 and the limit switch in Z direction 16 are all fitted between the piston cylinder 5 and the sleeve 6 and inside the piston cylinder 5.

The load of the presented vibration isolator is supported in such a way: the clean air compressor 3 feeds clean compressed air into the piston cylinder 5 via the air pipe 26, the electromagnetic valve 18 and the air inlet 23. The controller 19 adjusts the open degree of the electromagnetic valve 18 according the feedback signal of the air pressure sensor 17. As a result, the air pressure in the piston cylinder 5 is precisely adjusted so that the upward force applied on the piston cylinder 5 is balanced with load, gravity of the piston cylinder 5 and other parts fitted together with it.

In this embodiment, the pressure of clean compressed air in the piston cylinder 5 is 0.4 Mpa, the effective radius of the lower surface of the piston cylinder 5 is 100 mm, so the mass that a single vibration isolator can support is: $m = \rho \times \pi r^2 / g \approx 1282$ kg, where $\rho$ is the air pressure, P=0.4 Mpa, r is the effective radius of the lower surface of the piston cylinder 5, r=100 mm, and g is the gravity acceleration, g=9.8 m/m.

Figure 4:
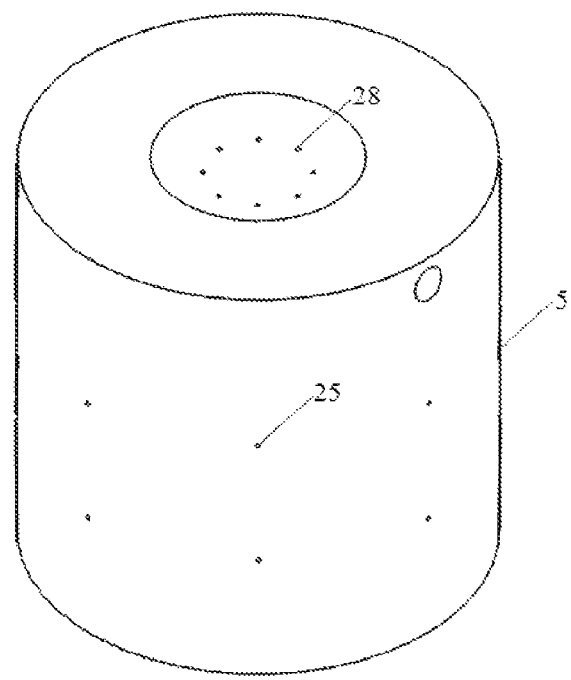
FIG. 4 is one embodiment of throttle holes in the cylindrical air bearing surface and the spherical air bearing surface of the piston cylinder.

A preferred embodiment of throttle holes in cylindrical air bearing surface of sleeve 6 is provided with reference to FIG. 4. In this embodiment, two rows of throttle holes in cylindrical air bearing surface 25 are uniformly distributed in a circle direction in the side wall of the piston cylinder 5. There are 8 throttle holes with diameter of ϕ0.2 mm in each row. 8 throttle holes in spherical air bearing surface 28 are uniformly distributed in a circle around the center on the top surface of piston cylinder 5.

In the accompanying drawings:

| | |
|---|---|
| upper mounting plate | 1 |
| lower mounting plate | 2 |
| clean air compressor | 3 |
| main body | 4 |
| piston cylinder | 5 |
| sleeve | 6 |
| spherical air bearing | 7 |
| voice coil motor in Z direction | 10 |
| iron yoke of motor Z | 10a |
| magnetic block of motor Z | 10b |
| coil skeleton of motor Z | 10c |
| coil of motor Z | 10d |
| mounting piece of motor Z | 10e |
| displacement sensor in X direction | 11 |
| displacement sensor in Y direction | 12 |
| mounting piece of grating Y | 12a |
| reading head of grating Y | 12b |
| glass ruler of grating Y | 12c |
| displacement sensor in Z direction | 13 |
| mounting piece of grating Z | 13a |
| reading head of grating Z | 13b |
| glass ruler of grating Z | 13c |
| limit switch in X direction | 14 |
| limit switch in Y direction | 15 |
| limit block of switch Y | 15a |
| Hall switch of switch Y | 15b |
| mounting piece of switch Y | 15c |
| mounting piece of limit Y | 15d |
| limit switch in Z direction | 16 |
| limit block of switch Z | 16a |
| Hall switch of switch Z | 16b |
| mounting piece of switch Z | 16c |
| air pressure sensor | 17 |
| electromagnetic valve | 18 |
| controller | 19 |
| driver | 20 |
| gap of magnetic suspending | 21 |
| cylindrical air bearing surface | 22 |
| air inlet | 23 |
| magnetically suspended planar motor | 24 |
| the mover of planar motor | 24a |
| the stator of planar motor | 24b |
| throttle hole in cylindrical air bearing surface | 25 |
| air pipe | 26 |
| spherical air bearing surface | 27 |
| throttle hole in spherical air bearing surface | 28 |

The invention claimed is:

1. A magnetically suspended and plane-drove vibration isolator with zero stiffness, comprising:
    a upper mounting plate (1),
    a lower mounting plate (2),
    a main body (4) fitted between the upper mounting plate (1) and the lower mounting plate (2), and
    a clean air compressor (3) connected to the main body (4) through an air pipe (26);
    wherein the main body (4) comprising
    a downside-down sleeve (6) lubricated and supported against the lower mounting plate (2) by a magnetically suspended planar motor (24),
    a upside-down piston cylinder (5) fitted in the sleeve (6) and lubricated against the sleeve (6) by a cylindrical air bearing surface (22),
    a spherical air bearing (7) fitted between the piston cylinder (5) and the upper mounting plate (1);
    a voice coil motor in a vertical or Z direction (10) for providing a vertical driving force, a displacement sensor in Z direction (13) and a limit switch in the Z direction (16) having respective sensitive directions along the direction of the vertical driving force that are fitted between the piston cylinder (5) and the sleeve (6);
    a magnetically suspended planar motor (24) for providing a first horizontal driving force and a second horizontal driving force that are perpendicular to each other;
    a displacement sensor in a first horizontal or X direction (11) and a limit switch in the X direction (14) having respective sensitive directions along the direction of the first horizontal driving force that are fitted between a sleeve cylinder (6) and the lower mounting plate (2);
    a displacement sensor in a second horizontal or Y direction (12) and a limit switch in the Y direction (15) having respective sensitive directions along the direction of the second horizontal driving force that are fitted between the sleeve cylinder (6) and the lower mounting plate (2);
    a controller (19) having signal input terminals connected to the displacement sensor in the X direction (11), the displacement sensor in the Y direction (12) and the displacement sensor in the Z direction (13) as well as the limit switch in the X direction (14), the limit switch in the Y direction (15) and the limit switch in the Z direction (16) and signal output terminals; and
    a driver (20) having signal input terminals connected to signal output terminals of the controller (19) and signal output terminals connected to the magnetically suspended planar motor (24) and the voice coil motor in the Z direction (10) respectively,
    wherein an air pressure sensor (17) is fitted inside the piston cylinder (5) which is connected to a signal input terminal of the controller (19), and a signal output terminal of the driver (20) is connected to an electromagnetic valve (18) fitted in the piston cylinder (5), and
    wherein the magnetically suspended planar motor (24) is configured as follows: the mover of planar motor (24a) is fitted on the bottom of the sleeve (6), the stator of planar motor (24b) is oppositely fitted on the top of the lower mounting plate (2).

2. A magnetically suspended and plane-drove vibration isolator with zero stiffness according to claim 1, wherein voice coil motor in Z direction (10) is a cylindrical voice coil motor or a flat voice coil motor.

3. A magnetically suspended and plane-drove vibration isolator with zero stiffness according to claim 1, wherein the limit switch in X direction (14), the limit switch in Y direction (15) and the limit switch in Z direction (16) are mechanical limit switches, Hall limit switches or photoelectric limit switches.

4. A magnetically suspended and plane-drove vibration isolator with zero stiffness according to claim 1, wherein the air pressure inside the piston cylinder (5) is within the range of 0.1 MPa~0.8 MPa.

5. A magnetically suspended and plane-drove vibration isolator with zero stiffness according to claim 1, wherein the thickness of a gap of magnetic suspending (21) between the mover of the magnetically suspended planar motor (24*a*) and the stator of the magnetically suspended planar motor (24*b*) is within the range of 0.01 mm-1 mm.

* * * * *